United States Patent [19]

Asai et al.

[11] Patent Number: 4,657,813
[45] Date of Patent: Apr. 14, 1987

[54] MAGNETIC RECORDING MEDIUM

[75] Inventors: Takamitsu Asai; Masaaki Fujiyama, both of Kanagawa, Japan

[73] Assignee: Fuji Photo Film Co., Ltd., Kanagawa, Japan

[21] Appl. No.: 714,282

[22] Filed: Mar. 21, 1985

[30] Foreign Application Priority Data

Mar. 22, 1984 [JP] Japan .................. 59-55066

[51] Int. Cl.$^4$ .......................................... G11B 5/714
[52] U.S. Cl. .................. 428/328; 252/62.54; 427/128; 428/329; 428/694; 428/900
[58] Field of Search .............. 428/694, 329, 900, 328; 427/131, 128; 252/62.56, 62.54; 360/134–136

[56] References Cited

U.S. PATENT DOCUMENTS

| | | | |
|---|---|---|---|
| 3,389,014 | 6/1968 | Akashi | 428/329 |
| 3,740,266 | 6/1973 | Akashi | 428/329 |
| 4,237,189 | 12/1980 | Deffayes | 428/329 |
| 4,239,637 | 12/1980 | Naruse | 427/132 |
| 4,281,043 | 7/1981 | Deffeyes | 428/694 |
| 4,341,648 | 7/1982 | Kubo | 252/62.56 |
| 4,565,726 | 1/1986 | Oguchi | 428/694 |

Primary Examiner—Ellis P. Robinson
Attorney, Agent, or Firm—Sughrue, Mion, Zinn, Macpeak & Seas

[57] ABSTRACT

A magnetic recording medium is described, comprising a non-magnetic support having provided thereon a magnetic layer containing magnetic particles and a binder, wherein the magnetic particles comprise (1) ferromagnetic hexagonal crystallized tabular shape particles having an axis of easy magnetization in a direction vertical to the tabular plane thereof and (2) ferromagnetic ellipsoidal particles having an acicular ratio (length/width) of 1.5/1 to 10/1 and having a saturation magnetization of 60 emu/g or more.

5 Claims, 2 Drawing Figures

4,657,813

MAGNETIC RECORDING MEDIUM

FIELD OF THE INVENTION

The present invention relates to a magnetic recording medium, and more particularly it relates to a magnetic recording medium having an improved output over a wide wavelength region and having a low output fluctuation when the magnetic recording medium is used in the shape of a disc which rotates for recording and replaying.

BACKGROUND OF THE INVENTION

A magnetic recording medium comprising a non-magnetic support having coated thereon a coating composition of ferromagnetic particles of acicular crystals such as $\gamma$-$Fe_2O_3$ or $CrO_2$, dispersed in a binder, has been widely used for recording and replaying.

Recently, it has been strongly desired to improve recording density in order to record large volumes of information and to minimize the size of magnetic recording apparatus. Therefore, it is necessary that the maximum dimension of acicular magnetic particles be much smaller than the wavelength to be recorded or the length of a recording bit, in order to prepare a recording medium suitable for high density recording using conventional acicular magnetic particles. Acicular particles having a dimension of about 0.3 $\mu$m have been commercially realized, and the minimum wavelength to be recorded therewith is about 1 $\mu$m.

It is necessary to further reduce the acicular magnetic particle size, for example, to particles having a diameter of 100 Å or less, and having a particle volume of $10^{-17}$ cm or less, in order to obtain a medium useful for desired higher density recording. However, the magnetic characteristics deteriorate, because the particle volume is so small that its crystalline structure becomes out of order, and magnetic orientation is difficult to successfully carry out when a magnetic field is applied to magnetic layer.

In general, a magnetic recording disc is produced by punching out a disc from a web coated with a magnetic coating composition. On the other hand, when a magnetic coating composition having dispersed therein acicular magnetic particles having an acicular ratio (length/width) of 10/1 or more is coated on a web, the magnetic particles tend to spontaneously be oriented in the coating direction. Since it is difficult to completely remove the orientation of the magnetic particles, output fluctuation generates periodically when a magnetic recording disc punched out from the coated web rotates.

In this regard, a magnetic recording medium containing hexagonal crystallized ferrite having a tabular shape and having an axis of easy magnetization in a direction vertical to the tabular plane thereof, which is subjected to magnetic orientation in a machine direction is known, as disclosed, for example, in U.S. Pat. No. 4,425,401 and Japanese Patent Application (OPI) No. 6526/83 (the term "OPI" as used herein refers to a "published unexamined Japanese patent application").

A magnetic recording medium containing such hexagonal crystallized ferrite can have high output in a high frequency range but cannot have high output in a low frequency range.

SUMMARY OF THE INVENTION

An object of the present invention is to provide a magnetic recording medium having an improved output in a wide wavelength region and having a low periodical output fluctuation when the magnetic recording medium in a disc shape rotates for recording and replaying.

Based on extensive research, it has now been found that output in a low frequency region can be improved and output fluctuation can be considerably reduced by the use of tubular ferromagnetic particles and ferromagnetic ellipsoidal particles having an acicular ratio of 1.5/1 to 10/1 and having saturation magnetization of 60 emu/g or more.

Thus, the object of the present invention is accomplished by a magnetic recording medium comprising a non-magnetic support having provided thereon a magnetic layer containing magnetic particles and a binder, wherein the magnetic particles comprise ferromagnetic hexagonal crystallized tabular shape particles having an axis of easy magnetization in a direction vertical to the tabular plane thereof and ferromagnetic ellipsoidal particles having acicular ratio of 1.5/1 to 10/1 and having a saturation magnetization of 60 emu/g or more.

DETAILED DESCRIPTION OF THE INVENTION

Figure 1:
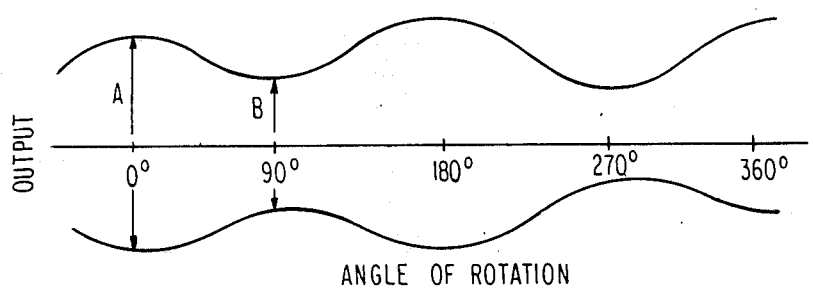
FIG. 1 is a graph showing waves of output fluctuation during rotation.

The ferromagnetic hexagonal crystallized tabular shape particles having an axis of easy magnetization in a direction vertical to the tubular plane thereof which are used in the present invention include hexagonal crystallized ferrite particles such as barium ferrite, strontium ferrite, lead ferrite, calcium ferrite, and the substituents thereof, manganese-bismuth, or hexagonal crystallized cobalt alloy. The preferred particles are Co-substituted barium ferrite and Co-substituted strontium ferrite. The ferromagnetic particles used in the present invention preferably have a tabular diameter (average particle diameter) of from 0.01 to 10 $\mu$m, more preferably from 0.03 to 0.10 $\mu$m, and a tabular thickness (average thickness) of from 0.005 to 5 $\mu$m, more preferably from 0.015 to 0.05 $\mu$m. The tabular ratio (tubular diameter/table thickness) is 2/1 or more, and preferably from 3/1 to 10/1.

The tabular shape ferromagnetic particles generally have a coercive force of 200 to 2,000 Oe.

The tabular shape ferromagnetic particles used in the present invention can be produced in a conventional method, as described in, for example, U.S. Pat. No. 4,341,648.

The ellipsoidal ferromagnetic particles used in the present invention include ferromagnetic ellipsoidal particles of cobalt added iron oxide type.

The ellipsoidal ferromagnetic particles are obtained by the method which comprises forming an $Fe(OH)_2$ suspension by the reaction of an aqueous solution of ferrous salt and an aqueous alkali solution, adding a dicarboxylic acid ion having a straight chain and a double bond in the suspension, and then passing oxygencontaining gas through the suspension to obtain water-containing ferric oxide particles by oxidation.

The dicarboxylic acids that can be used include maleic acid, water-soluble maleic acid salt and fumaric acid. The maleic acid salts include the sodium salt, potassium salt and ammonium salt.

The effect of adding dicarboxylic acid is that particle length of the resulting water-containing ferric oxide particles is reduced shorter, the ratio of length/width is smaller and reproduction ability is better than in the case wherein dicarboxylic acid is not added.

The dibasic acid is preferably added in an amount of 0.001 to 0.1 mol per liter of water and in an amount of 0.005 to 0.5 mol per mol of $Fe^{2+}$. The effect is reduced if the additive amount is less than the above range. If the additive amount is more than the above range, the excessive amount of the acid is wasteful and increases time needed for the reaction, which is disadvantageous.

The method for preparing ellipsoidal ferromagnetic particles is disclosed in detail in Japanese Patent Application (OPI) No. 186923/82.

Ferromagnetic ellipsoidal particles of cobalt-added iron oxide type can be reduced in hydrogen gas to prepare alloy magnetic particles, maintaining the same apparent shape. Ferromagnetic ellipsoidal particles of cobalt-added iron oxide type and alloy magnetic particles have saturation magnetization of 60 emu/g or more.

The ratio of length/width of the ellipsoidal particles is from 1.5/1 to 10/1, and preferably from 1.5/1 to 4.5/1. The length (average) is generally from 0.01 to 10 μm, preferably from 0.05 to 1 μm, and more preferably from 0.1 to 0.6 μm. The width (average) is 0.005 to 1 μm, preferably from 0.01 to 0.5 μm, and more preferably 0.05 to 0.3 μm.

Thus, a magnetic recording medium having an improved output in a wide region, that is, from long wavelength region to short wavelength region and having a low output fluctuation when the magnetic recording medium in a disc shape is rotated for recording and replaying, can be obtained by the combined use of ferromagnetic hexagonal crystallized tabular shape particles having an axis of easy magnetization in a direction vertical to the tubular plane thereof and ferromagnetic ellipsoidal particles.

The mixing weight ratio of the ferromagnetic hexagonal crystallized tabular particles to the ferromagnetic ellipsoidal particles is preferably from 95/5 to 20/80, more preferably from 75/25 to 25/75, and most preferably 75/25 to 50/50.

A binder and an additive can be added to the magnetic layer in addition to the above-described ferromagnetic particles.

Additives that can be used include a dispersing agent, a lubricating agent, an abrasive agent, an antistatic agent, and the like.

Binders that can be used include conventionally known thermoplastic resins, thermosetting resins, reactive type resins, and mixtures thereof.

Thermoplastic resins which are preferably used in the present invention are those having a softening temperature of 150° C. or less, an average molecular weight of from 10,000 to 200,000, and a polymerization degree of from about 200 to 2,000. Typical examples of the thermoplastic resins are copolymers of vinyl chloride and vinyl acetate, copolymers of vinyl chloride, vinyl acetate, and maleic acid, copolymers of vinyl chloride and vinylidene chloride, copolymers of vinyl chloride and acrylonitrile, copolymers of acrylate and acrylonitrile, copolymers of acrylate and vinylidene chloride, copolymers of acrylate and styrene, copolymers of methacrylate and acrylonitrile, copolymers of methacrylate and vinylidene chloride, copolymers of methacrylate and styrene, urethane elastomers, polyvinyl fluoride, copolymers of vinylidene chloride and acrylonitrile, copolymers of butadiene and acrylonitrile, a polyamide resin, polyvinyl butyral, cellulose derivatives (e.g., cellulose acetate butyrate, cellulose diacetate, cellulose triacetate, cellulose propionate, nitrocellulose, and the like), copolymers of styrene and butadiene, polyester resins, various synthetic rubber type thermoplastic resins (e.g., polybutadiene, polychloroprene, polyisoprene, copolymers of styrene and butadiene, and the like), and mixtures thereof.

The thermosetting resins or reactive type resins which are preferably used in the present invention have a molecular weight of 200,000 or less in the coating composition. After the coating composition is coated and dried, the molecular weight of those resins becomes infinite by a reaction such as condensation and addition reactions. Of the above-described resins, resins that are not softened or melted until they are heat-decomposed are preferred. Specific examples of such resins include (novolak) phenol and formalin resins, (resol) phenol and formalin resins, phenol and furfural resins, xylene and formaldehyde resins, urea resins, melamine resins, dry oil modified alkyd resins, phenol resins modified alkyd resins, maleic acid resins modified alkyd resins, unsaturated polyester resins, a mixture of epoxy resins and hardening agents (examples of hardening agents include polyamine, acid anhydride, polyamide resins and the like), polyester resins having an isocyanate group at the end of the molecule that are curable with humidity, polyether resins having an isocyanate group at the end of the molecule and curable with humidity, a polyisocyanate prepolymer (a compound having at least three isocyanate groups in a molecule which is obtained by the reaction of diisocyanates and a low molecular weight triol, a trimer of diisocyanates, and a tetramer of diisocyanates), a mixture of a polyisocyanate prepolymer and a resin containing active hydrogen (examples of resins having active hydrogen include a polyester polyol, a polyether polyol, copolymers of acrylate, copolymers of maleic acid, copolymers of 2-hydroxyethyl methacrylate, copolymers of parahydroxystyrene, and the like), and mixtures thereof.

Of these binders, copolymers of vinyl chloride, vinyl acetate, and maleic anhydride are the most effective for the combined use of ferromagnetic particles according to the present invention.

The binders can be used alone or in combination and other additives can be added thereto. The mixing range of the binder is generally from 8 to 400 parts by weight, and preferably from 10 to 200 parts by weight, per 100 parts by weight of ferromagnetic particles.

The dispersing agents (wetting agents for pigments) include a fatty acid having from 12 to 18 carbon atoms ($R_1COOH$, wherein $R_1$ is an alkyl group having from 11 to 17 carbon atoms, or an alkenyl group having from 11 to 17 carbon atoms) such as caprylic acid, capric acid, lauric acid, myristic acid, palmitic acid, stearic acid, oleic acid, elaidic acid, linolic acid, linolenic acid, or stearolic acid; a metal soap of alkali metal (e.g., Li, Na, K, and the like) or alkali earth metal (e.g., Mg, Ca, Ba) of the fatty acid; an amide of the fatty acid, polyalkylene oxide alkyl phosphate; lecithin; trialkyl polyolefin oxyquaternary ammonium salt (alkyl groups having from 1 to 5 carbon atoms, and olefin such as ethylene, propylene, and the like). Additionally, higher alcohols having 12 or more carbon atoms and sulfate can be used. These dispersing agents can be used in an amount of from 0.5 to 20 parts by weight per 100 parts by weight of binder.

The lubricating agents used in the present invention include silicon oil such as a dialkyl polysiloxane (alkyl groups having from 1 to 5 carbon atoms), a dialkoxy polysiloxane (with alkoxy groups having from 1 to 4 carbon atoms), a monoalkyl monoalkoxy polysiloxane (with an alkyl group having from 1 to 5 carbon atoms and an alkoxy group having from 1 to 4 carbon atoms), a phenyl polysiloxane, fluoroalkyl polysiloxane (with alkyl groups having from 1 to 5 carbon atoms); electroconductive particles such as graphite; inorganic particles such as molybdenum disulfide or tungsten disulfide; plastic particles such as polyethylene, polypropylene, copolymers of polyethylene and vinyl chloride or polytetrafluoroethylene; α-olefin polymerized compound; unsaturated aliphatic hydrocarbon which is liquid at a normal room temperature (20° C.) (i.e., a compound having an n-olefin double bond at the end of the carbon chains, about 20 carbon atoms); a fatty acid ester consisting of a monobasic fatty acid having from 12 to 20 carbon atoms, and a monovalent alcohol having from 3 to 12 carbon atoms, and a fluorocarbon. These lubricating agents can be used in an amount of from 0.2 to 20 parts by weight based on 100 parts by weight of the binder.

The abrasive agents that can be used are those generally used, such as a fused alumina, silicon carbide, chromium oxide ($Cr_2O_3$), corundum, artificial corundum, diamond, artificial diamond, garnet and emery (main components: corundum and magnetite) and the like. These abrasive agents have a Mohs hardness of 5 or more, an average particle size of from 0.05 to 5 μm, and preferably from 0.1 to 2 μm. These abrasive agents can be used in an amount of from 0.5 to 20 parts by weight per 100 parts by weight of binder.

The antistatic agents used in the present invention include electroconductive fine particles such as carbon black or carbon black graft polymer; natural surface active agents such as saponin; nonionic surface active agents such as alkylene oxide, glycerin or glycidol; cationic surface active agents such as higher alkyl amines, quaternary ammonium salts, heterocyclic compounds of pyridine, phosphonium or sulfonium salts; anionic surface active agents such as carboxylic acid, sulfonic acid, phosphoric acid, and a compound having an acid group of sulfate group and phosphate group; and amphoteric surface active agents such as amino acids, amino sulfonic acids, or sulfates or phosphates of aminoalcohols.

These electroconductive fine particles can be used in an amount of from 0.2 to 20 parts by weight and a surface active agent can be used in an amount of 0.1 to 10 parts by weight per 100 parts by weight of the binder.

These surface active agents can be used alone or in combination. They can be used not only as antistatic agents, but can also be used for improving dispersion, magnetic characteristics, lubricating properties, and as a coating aid.

The magnetic layer used in the present invention is a coated type magnetic layer which is prepared by mixing, kneading, and dispersing the ferromagnetic particles with binders, additives, and solvents, coating the resulting magnetic composition on the support, providing magnetic orientation, and drying.

The ferromagnetic particles, binders, dispersing agents, lubricants, abrasive agents, antistatic agents and solvents are mixed and kneaded to prepare a magnetic coating composition.

The ferromagnetic particles and above-described additives can be introduced in a mixing and kneading device at the same time or in order separately. For example, ferromagnetic particles can be added to the solvent which contains dispersing agents and then mixed and kneaded for a certain period of time to prepare a magnetic coating composition.

Various mixing and kneading devices can be used for kneading and mixing the magnetic coating composition. The devices include a two-roll mill, a three-roll mill, a ball mill, a pebble mill, a trommell, a sand grinder, a Szegvari attriter, a high speed impeller dispersing device, a high speed stone mill, a high speed impact mill, a disperser, a kneader, a high speed mixer, a homogenizer, and an ultrasonic dispersing device.

Techniques of kneading, mixing, and dispersing are disclosed in T. C. Patton, *Paint Flow and Pigment Dispersion*, (1964, published by John Wiley & Sons), as well as in U.S. Pat. Nos. 2,581,414 and 2,855,156.

The method for coating a magnetic layer on a support includes an air doctor coating, a blade coating, a rod coating, an extruding coating, an air knife coating, a squeeze coating, a dip coating, a reverse roll coating, a gravure coating, transfer roll coating, a kiss coating, a cast coating, a spray coating, and spin coating. Other coating methods can be also used in this invention. Specific explanation of coating methods is provided in *Coating Engineering*, on pages 253 to 277, published on Mar. 20, 1971 by Asakura Shoten.

The multilayered magnetic recording medium is the magnetic recording medium containing at least two magnetic layers which is prepared by coating the magnetic coating composition on the non-magnetic support by one of above methods and drying it, which is continuously repeated. The magnetic recording medium having at least two magnetic layers can be prepared by a simultaneous multi-coating method, as disclosed in Japanese Patent Application (OPI) Nos. 98803/73 (West German Pat. No. DT-OS 2,309,159) and 99233/73 (West German Pat. No. DT-AS 2,309,158).

The dry thickness of the magnetic layer is generally from about 0.5 to 12 μm. In the case of using multiple magnetic layers, the total dry thickness of the multiple magnetic layers is also generally from about 0.5 to 12 μm. The dry thickness can be determined depending upon the use, the shape and the standard of the magnetic recording medium.

The magnetic layer thus provided on the support is subjected to magnetic orientation, if necessary, and is dried. The magnetic layer is then subjected to surface smoothing treatment, if desired, and slit to a desired shape to prepare a magnetic recording medium according to the present invention.

It has been found that a magnetic recording medium having a smooth surface and excellent wear resistance can be obtained by providing surface smoothing treatment on the magnetic layer. Smoothing treatment before the magnetic layer is dried or a calendering treatment after the magnetic layer is dried can be provided for this purpose.

When the non-magnetic support is a film, a tape, a sheet, or a card, a backing layer can be provided on the back surface of the support (i.e., on the opposite surface from the surface on which the magnetic layer is formed) for preventing electrocharging, print-through, wow-flutter, improving the strength of the magnetic recording medium, and making the back surface mat. The backing layer can be prepared by coating at least one additive such as a lubricant, abrasive agent, or antistatic agent, or coating a coating composition containing dispersing agents, binders and solvents having mixed, kneaded and dispersed on a back surface of the support and drying it. The magnetic layer or the backing layer can be provided first on the support.

The additives which are preferably used in the present invention include carbon black, graphite, talc, $Cr_2O_3$, $TiO_2$, $CaCO_3$-$FeOx$, or silicon oil, which can be used alone or in combination. Of the above-described binders, thermosetting resins or reactive type resins are preferred.

Based on the total solid content of the backing layer, additives of inorganic compounds can generally be used in an amount of from about 20 to 85 wt%, and preferably from 30 to 80 wt%, and additives of organic compounds can generally be used in an amount of from about 0.1 to 30 wt%, preferably 0.2 to 20 wt%. The dry thickness can be selected in the range of about 5.0 μm or less, depending upon the total thickness, the use, the shape and the purpose of the magnetic recording medium.

The present invention will be illustrated in more detail by the following Examples. In the Examples, all parts are by weight.

EXAMPLE

A Composition

Co-substituted Ba ferrite (tabular particle having average particle diameter of 0.1 μm, tabular ratio of 3.3 and average thickness of 0.03 μm, coercive force 660 Oe): 300 parts
Graphite particles: 15 parts
Copolymers of vinyl chloride, vinyl acetate and maleic anhydride (polymerization degree 450): 45 parts
Amyl stearate: 10 parts
Lecithin: 3 parts
Chromium oxide ($Cr_2O_3$): 5 parts
Methyl ethyl ketone: 300 parts
Toluene: 300 parts The above composition was mixed and dispersed by a sand grinder to prepare A Composition.

B Composition

Magnetic particles of Co-added iron oxide (granular shape, acicular ratio (length/width): about 3/1, average length 0.1 μm, coercive force 660 Oe, saturation magnetization 70 emu/g): 300 parts
Graphite particles: 15 parts
Copolymers of vinyl chloride, vinyl acetate and maleic anhydride (polymerization degree 450): 45 parts
Amyl stearate: 10 parts
Lecithin: 3 parts
Chromium oxide ($Cr_2O_3$): 5 parts
Methyl ethyl ketone: 300 parts
Toluene: 300 parts The above composition was mixed and dispersed by a sand grinder to prepare B Composition.

The whole amounts of A Composition and B Composition and 100 parts of polyester polyol were homogeneously mixed and 60 parts of polyisocyanate was added thereto and they were mixed and dispersed by a sand grinder to prepare a curable magnetic composition.

The above magnetic composition was coated by a gravure roll in a dry thickness of 4 μm on a polyethylene terephthalate film having a thickness of 75 μm which had been subjected to corona discharge treatment, and was dried and identified as Sample No. 1.

COMPARATIVE EXAMPLE 1

Into A Composition, 50 parts of polyester polyol were added and mixed homogeneously and 30 parts of polyisocyanate were added thereto and they were mixed and dispersed by a sand grinder to prepare a curable magnetic coating composition.

The above magnetic coating composition was coated by a gravure roll in a dry thickness of 4 μm on a polyethylene terephthalate film having a thickness of 75 μm which had been subjected to corona discharge treatment, followed by drying to prepare Sample No. 2.

COMPARATIVE EXAMPLE 2

50 parts of polyester polyol were added to B Composition and were homogeneously mixed, 30 parts of polyisocyanate were added thereto and were mixed and dispersed by a sand grinder to prepare a curable magnetic coating composition.

The above magnetic coating composition was coated by a gravure roll in a dry thickness of 4 μm on a polyethylene terephthalate film having a thickness of 75 μm which had been subjected to corona discharge treatment, followed by drying to prepare Sample No. 3.

C Composition

Co-added iron oxide magnetic particles (acicular ratio: about 13/1, average length 0.3 μm, coercive force 660 Oe): 300 parts
Graphite particles: 15 parts
Copolymers of vinyl chloride, vinyl acetate and maleic anhydride (polymerization degree: 450): 45 parts
Amyl stearate: 10 parts
Lecithin: 3 parts
Chromium oxide ($Cr_2O_3$): 5 parts
Methyl ethyl ketone: 300 parts
Toluene: 300 parts The above composition was mixed and dispersed by a sand grinder to prepare C Composition.

D Composition

Alloy magnetic particles (acicular ratio: about 13/1, average length: 0.3 μm, coercive force: 1,300 Oe): 300 parts
Graphite particles: 15 parts
Copolymers of vinyl chloride, vinyl acetate and maleic anhydride (polymerization degree: 450): 45 parts
Amyl stearate: 10 parts
Lecithin: 3 parts
Chromium oxide ($Cr_2O_3$): 5 parts
Methyl ethyl ketone: 300 parts
Toluene: 300 parts The above composition was mixed and dispersed by a sand grinder to prepare D Composition.

COMPARATIVE EXAMPLE 3

The whole amounts of A Composition and C Composition and 100 parts of polyester polyol were mixed homogeneously, 60 parts of polyisocyanate were added thereto and they were mixed and dispersed by a sand grinder to prepare a curable coating composition.

The above coating composition was coated by a gravure roll in a dry thickness of 4 μm on a polyethylene terephthalate film having a thickness of 75 μm which had been subjected to corona discharge treatment and was dried to prepare Sample No. 4.

COMPARATIVE EXAMPLE 4

The whole amounts of A Composition and D Composition and 100 parts of polyester polyol were mixed homogeneously, 60 parts of polyisocyanate were added thereto and they were mixed and dispersed by a sand grinder to prepare a curable magnetic coating composition.

The above coating composition was coated by a gravure roll in a dry thickness of 4 μm on a polyethylene terephthalate film having a thickness of 75 μm which had been subjected to corona discharge treatment and was dried to prepare Sample No. 5.

Sample No. 1 of the Example and Sample Nos. 1 to 4 of Comparative Examples 1 to 4 were dried and were subjected to calendering treatment, and then were stamped out disc-shaped magnetic recording test pieces having a diameter of 50 mm each.

These discs were played and replayed with a ferrite head at 3,600 rpm, and the output was measured at the 40 mm diameter of the discs.

FIG. 1 is a graph showing waves of output fluctuation at periodic rotation and output fluctuation is observed at every 180°. The value of output fluctuation is determined as $(A-B)/A \times 100$ (%), wherein A is the highest output and B is the lowest output. The results of each sample are shown in Table 1.

TABLE 1

|  | Sample No. | Value of Output Fluctuation (%) |
| --- | --- | --- |
| Example | 1 | 3.0 |
| Comparative Example 1 | 2 | 4.4 |
| Comparative Example 2 | 3 | 4.5 |
| Comparative Example 3 | 4 | 15.0 |
| Comparative Example 4 | 5 | 18.0 |

Figure 2:
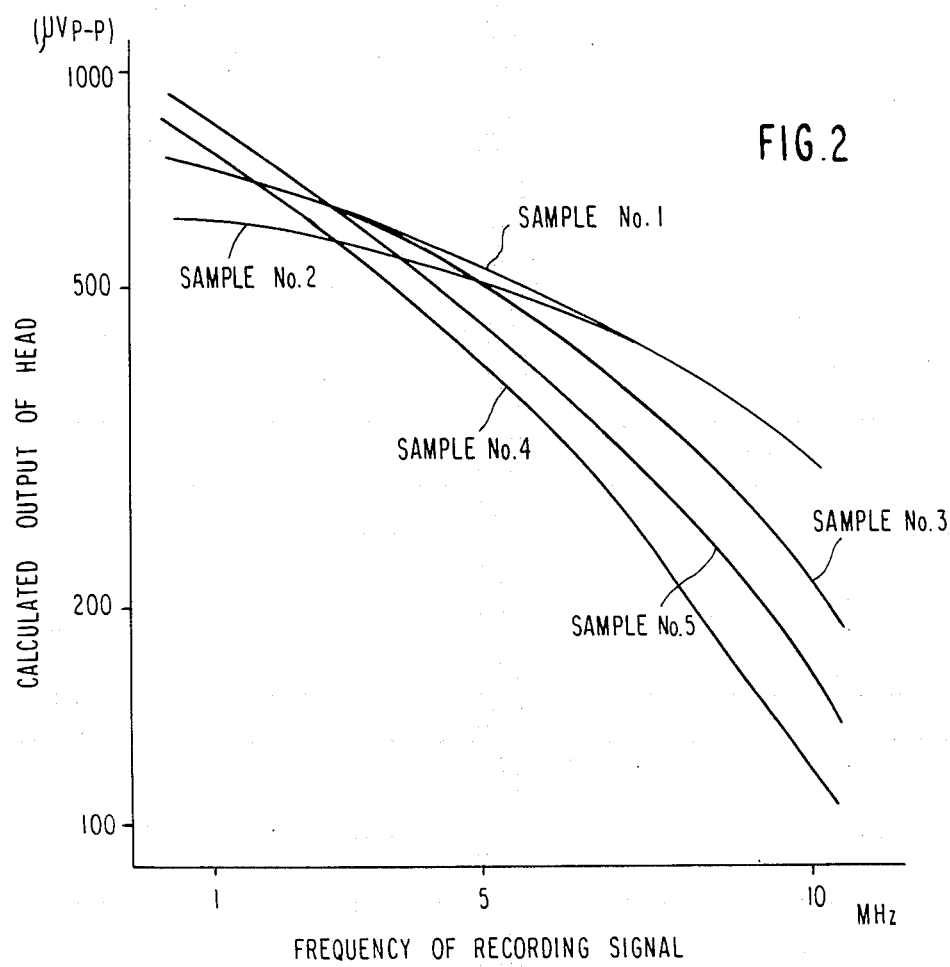
FIG. 2 is a graph showing the relationship between calculated head output and the frequency of recorded signals.

The relationship between output in FIG. 1, B (which is shown by head calculated output ($\mu$Vp−p)) and the frequency of the recording signal is shown in FIG. 2.

It is clear from FIGS. 1 and 2 that Sample No. 1 of the Example exhibits low output fluctuation and high output over a wide frequency region.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon a magnetic layer containing magnetic particles and a binder, wherein the magnetic particles comprise (1) ferromagnetic hexagonal crystallized tabular shape particles having an axis of easy magnetization in a direction vertical to the tabular plane thereof, a coercive force of 200 to 2,000 Oersteds and a tabular diameter of from 0.01 to 10 μm, a tabular thickness of from 0.005 to 5 μm, and a tabular ratio of 2/1 or more, and (2) ferromagnetic ellipsoidal particles having an acicular ratio of 1.5/1 to 10/1 having a saturation magnetization of 60 emu/g or more, the ferromagnetic ellipsoidal particles (2) having a length of from 0.05 to 1 μm and a width of from 0.01 to 0.5 μm wherein the mixing weight ratio of the ferromagnetic hexagonal crystallized tabular particles (1) to the ferromagnetic ellipsoidal particles (2) is from 95/5 to 20/80.

2. A magnetic recording medium as in claim 1, wherein
the ferromagnetic hexagonal crystallized tabular shape particles (1) have a tabular diameter of from 0.03 to 0.10 μm, a tabular thickess of from 0.015 to 0.05 μm, and a tabular ratio of from 3/1 to 10/1, and
the ferromagnetic ellipsoidal particles (2) have a length of from 0.1 to 0.6 μm and a width of from 0.05 to 0.3 μm.

3. A magnetic recording medium as in claim 1, wherein the mixing weight ratio of the ferromagnetic hexagonal crystallized tabular particles (1) to the ferromagnetic ellipsoidal particles (2) is from 75/25 to 25/75.

4. A magnetic recording medium as in claim 1, wherein the mixing weight ratio of the ferromagnetic hexagonal crystallized tabular particles (1) to the ferromagnetic ellipsoidal particles (2) is from 75/25 to 25/75.

5. A magnetic recording medium as in claim 2, wherein the acicular ratio of the ferromagnetic ellipsoidal particles is 1.5/1 to 4.5/1 and wherein the mixing weight ratio of the ferromagnetic hexagonal crystallized tabular particles (1) to the ferromagnetic ellipsoidal particles (2) is from 75/25 to 50/50.

* * * * *